(12) United States Patent
Overkamp et al.

(10) Patent No.: US 7,472,259 B2
(45) Date of Patent: Dec. 30, 2008

(54) MULTI-CYCLE INSTRUCTIONS

(75) Inventors: Gregory A. Overkamp, Austin, TX (US); Charles P. Roth, Austin, TX (US); Ravi P. Singh, Austin, TX (US)

(73) Assignee: Analog Devices, Inc., Norwood, MA (US)

( * ) Notice: Subject to any disclaimer, the term of this patent is extended or adjusted under 35 U.S.C. 154(b) by 1785 days.

(21) Appl. No.: 09/731,523

(22) Filed: Dec. 6, 2000

(65) Prior Publication Data

US 2002/0103991 A1  Aug. 1, 2002

(51) Int. Cl.
*G06F 9/30* (2006.01)
*G06F 9/40* (2006.01)

(52) U.S. Cl. .................. 712/219; 712/242; 712/245

(58) Field of Classification Search ............... 712/216, 712/218, 219, 242, 243, 245
See application file for complete search history.

(56) References Cited

U.S. PATENT DOCUMENTS

| | | | | |
|---|---|---|---|---|
| 4,493,029 A | * | 1/1985 | Thierbach | 712/243 |
| 4,807,185 A | * | 2/1989 | Kamiya | 711/200 |
| 5,005,118 A | * | 4/1991 | Lenoski | 712/213 |
| 5,127,103 A | * | 6/1992 | Hill et al. | 714/45 |
| 5,142,635 A | * | 8/1992 | Saini | 712/225 |
| 5,185,870 A | * | 2/1993 | Lenoski | 712/226 |
| 5,193,167 A | * | 3/1993 | Sites et al. | 711/163 |
| 5,253,308 A | * | 10/1993 | Johnson | 382/304 |
| 5,291,586 A | | 3/1994 | Jen et al. | 712/220 |

(Continued)

FOREIGN PATENT DOCUMENTS

| | | |
|---|---|---|
| EP | 0 809 180 | 11/1997 |
| JP | 02-190930 | 7/1990 |
| JP | 02-197924 | 8/1990 |
| JP | 04-260930 | 9/1992 |
| JP | 05-127894 | 5/1993 |
| JP | 06-161778 | 6/1994 |

OTHER PUBLICATIONS

InstantWeb. Online Computing Dictionary. ©1994-1999. Search Terms: Finite State Machine and Register http://www.instantweb.com/foldoc/foldoc.cgi?computer+dictionary.*
Free On-line Dictionary of Computing (FOLDOC). ©1996. Search term: Pipeline stall http://www.instantweb.com/foldoc/foldoc.cgi?query=Pipeline+stall.*
InstantWeb. Free On-Line Dictionary of Computing. http://www.instantweb.com/foldoc/foldoc.cgi?computer+dictionary Search terms: flash memory and non-volatile storage, 1995 and 1997.*
David Patterson et al., "Computer Architecture A Quantitative Approach", Second Edition, 1996, pp. 124-370.

*Primary Examiner*—Aimee J Li
(74) *Attorney, Agent, or Firm*—Goodwin Procter LLP

(57) ABSTRACT

In one embodiment, a pipelined processor is described that includes an execution pipeline having a plurality of stages and a multi-cycle instruction (MCI) controller adapted to assert a stall signal to stall the multi-cycle instruction within one of the stages of the execution pipeline. The MCI controller is adapted to issue a plurality of instructions to subsequent stages in the pipeline while the multi-cycle instruction is stalled.

37 Claims, 10 Drawing Sheets

U.S. PATENT DOCUMENTS

| | | | |
|---|---|---|---|
| 5,542,060 A | 7/1996 | Yoshida | 712/208 |
| 5,848,423 A * | 12/1998 | Ebrahim et al. | 707/206 |
| 5,893,121 A * | 4/1999 | Ebrahim et al. | 707/206 |
| 5,923,862 A | 7/1999 | Nguyen et al. | |
| 6,076,159 A | 6/2000 | Fleck et al. | |
| 6,209,082 B1 * | 3/2001 | Col et al. | 712/225 |
| 6,247,125 B1 | 6/2001 | Noel-Baron et al. | 712/241 |
| 6,349,383 B1 * | 2/2002 | Col et al. | 712/226 |

* cited by examiner

MULTI-CYCLE INSTRUCTIONS

BACKGROUND

This invention relates to executing multi-cycle instructions in a programmable processor.

A programmable processor, such as a microprocessor for a computer or a digital signal processing system, may support one or more "multi-cycle" machine instructions in which a single machine instructions directs the processor to perform multiple operations. For example, a typical multi-cycle machine instruction is a Load Multiple in which the processors performs a series of load operations in response to a single machine instruction. Another example is a "Push-Pop Multiple" instruction that directs the processor to push or pop multiple registers to or from a stack. Because multi-cycle instructions pack multiple operations into a single machine instruction, they typically reduce code size and improve operational efficiency of the programmable processor.

DESCRIPTION

Figure 1:
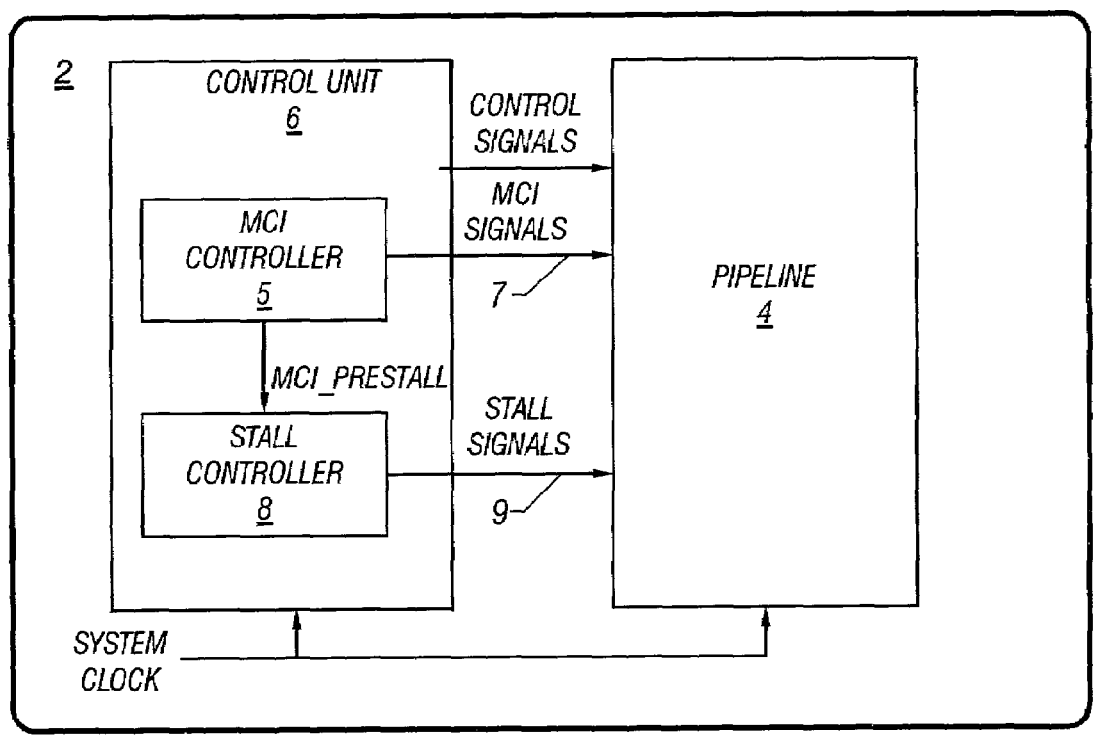
FIG. 1 is a block diagram illustrating an example of a pipelined programmable processor according to an embodiment of the invention.

FIG. 1 is a block diagram illustrating a programmable processor 2 that supports a number of multi-cycle machine instructions. Processor 2 includes an execution pipeline 4 and a control unit 6. Control unit 6 controls the flow of instructions and data through pipeline 4 in accordance with a system clock. During the processing of an instruction, control unit 6 may direct the various components of the pipeline to decode the instruction and correctly perform the corresponding operation including, for example, writing the results back to memory.

Instructions may be loaded into a first stage of pipeline 4 and processed through the subsequent stages. Each stage typically processes concurrently with the other stages. Data passes between the stages in pipeline 4 in accordance with the system clock signal. The results of the instructions emerge at the end of the pipeline 4 in rapid succession.

As described in detail below, processor 2 supports a number of multi-cycle instructions. In response to a multi-cycle instruction, stall controller 8 may stall one or more stages of pipeline 4 by asserting stall signals 9 in order to prevent pipeline 4 from fetching and decoding additional instructions. After stalling a portion of pipeline 4, multi-cycle instruction (MCI) controller 5 may assert MCI signals 7 and direct pipeline 4 to perform additional operations defined by the current multi-cycle instruction.

Figure 2:
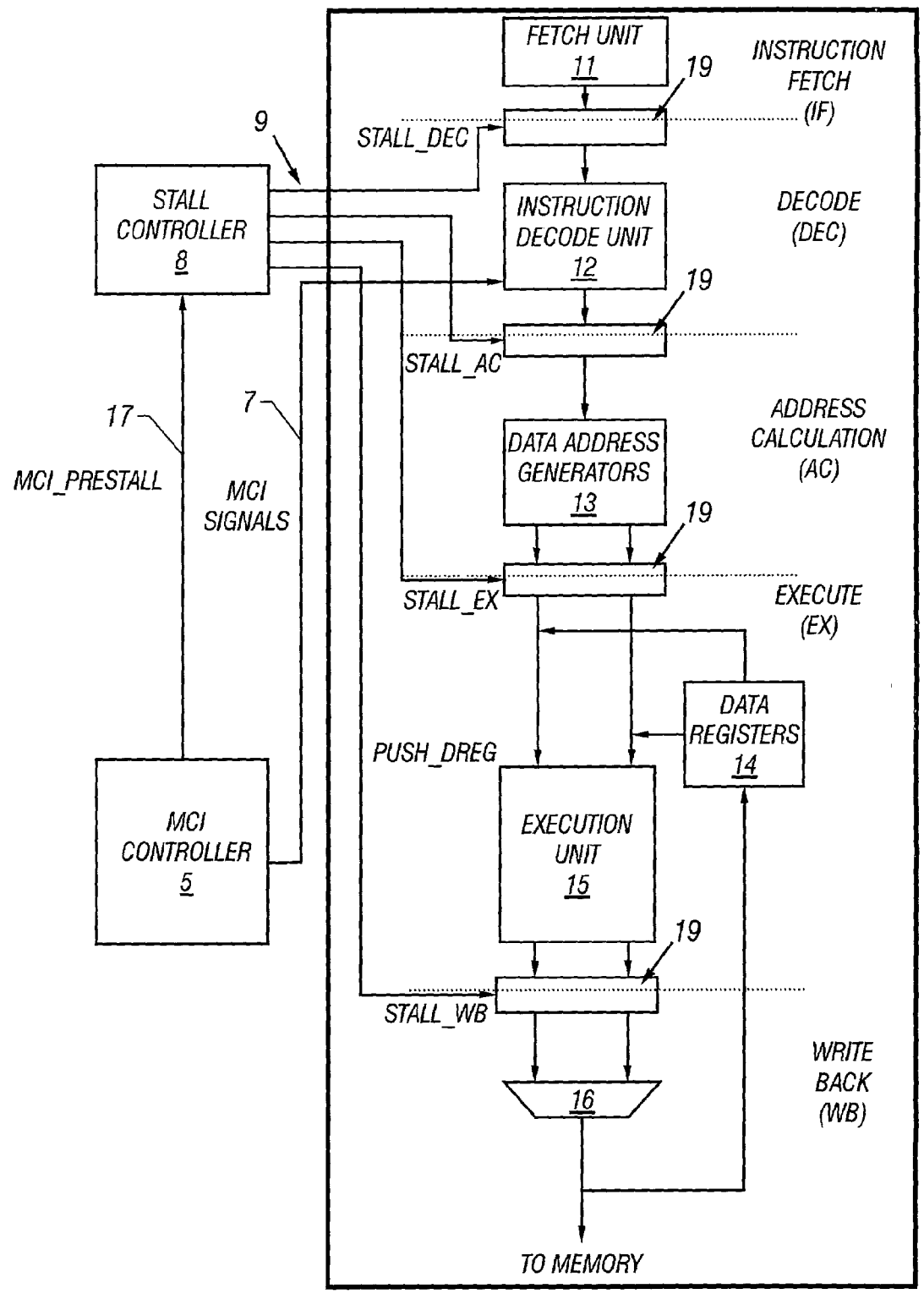
FIG. 2 is a schematic illustrating an example execution pipeline according to an embodiment of the invention.

FIG. 2 illustrates an example pipeline 4 according to the invention. Pipeline 4 may have, for example, five stages: instruction fetch (IF), instruction decode (DEC), address calculation (AC), execute (EX) and write back(WB). Instructions may be fetched from a memory device, such as main memory or an instruction cache during the first stage (IF) by fetch unit 11 and decoded during the second stage (DEC) by instruction decode unit 12. At the next clock cycle, the results are passed to the third stage (AC), where data address generators 13 calculate any memory addresses to perform the operation.

During the execution stage (EX), execution unit 15, performs a specified operation, such as adding or multiplying two numbers. Execution unit 15 may contain specialized hardware for performing the operations including, for example, one or more arithmetic logic units (ALU's), floating-point units (FPU) and barrel shifters. A variety of data may be applied to execution unit 15 such as the addresses generated by data address generators 13, data retrieved from memory or data retrieved from data registers 14. During the final stage (WB), the results pass through a unit 16 and are written back to data memory or to data registers 14.

A multi-cycle instruction behaves as multiple instructions being issued from the decode stage of pipeline 4 over several clock cycles. When an MCI is executing, it remains stalled in the decode stage of pipeline 4 while multiple "sub instructions" are sent down pipeline 4 under control of MCI controller 5. MCI controller 5 operates according to a number of internal state machines in order to direct instruction decode unit 12 to dispatch a number of operations over a number of clock cycles during the execution of the MCI.

Stall controller 8 may stall one or more stages of pipeline 4 by asserting stall signals 9 in order to prevent pipeline 4 from fetching and decoding additional instructions. More specifically, the stages of pipeline 4 include storage circuits, such as stage registers 19, for storing the results of the current stage. Stage registers 19 typically latch the results according to the system clock. Stage registers 19 receive the stall signals 9, which control whether or not stage registers 19 latch the results from the previous stage. In this manner, stall controller 8 may stall one or more stages of pipeline 4 in a response to a multi-cycle instruction.

Examples of multi-cycle instructions supported by processor 2 include a PushPopMultiple machine instruction, a Link instruction and an Unlink instruction. The PushPopMultiple instruction directs processor 2 to push or pop from 1 to N data registers and/or pointer registers. The PushPopMultiple remains stalled in the decode stage for a number of clock cycles equal to the number of registers being accessed. The following illustrates an example push multiple machine instruction:

$$[--sp]=(r7-r4,p5-p0)$$

In this example, a single machine instruction directs processor 2 to push four data registers (r4 through r7) and six pointer registers (p0 through p5). Generally, a single machine instruction may specify zero or more data registers and zero or more pointer registers, as long as at least one register is specified.

Figure 3:
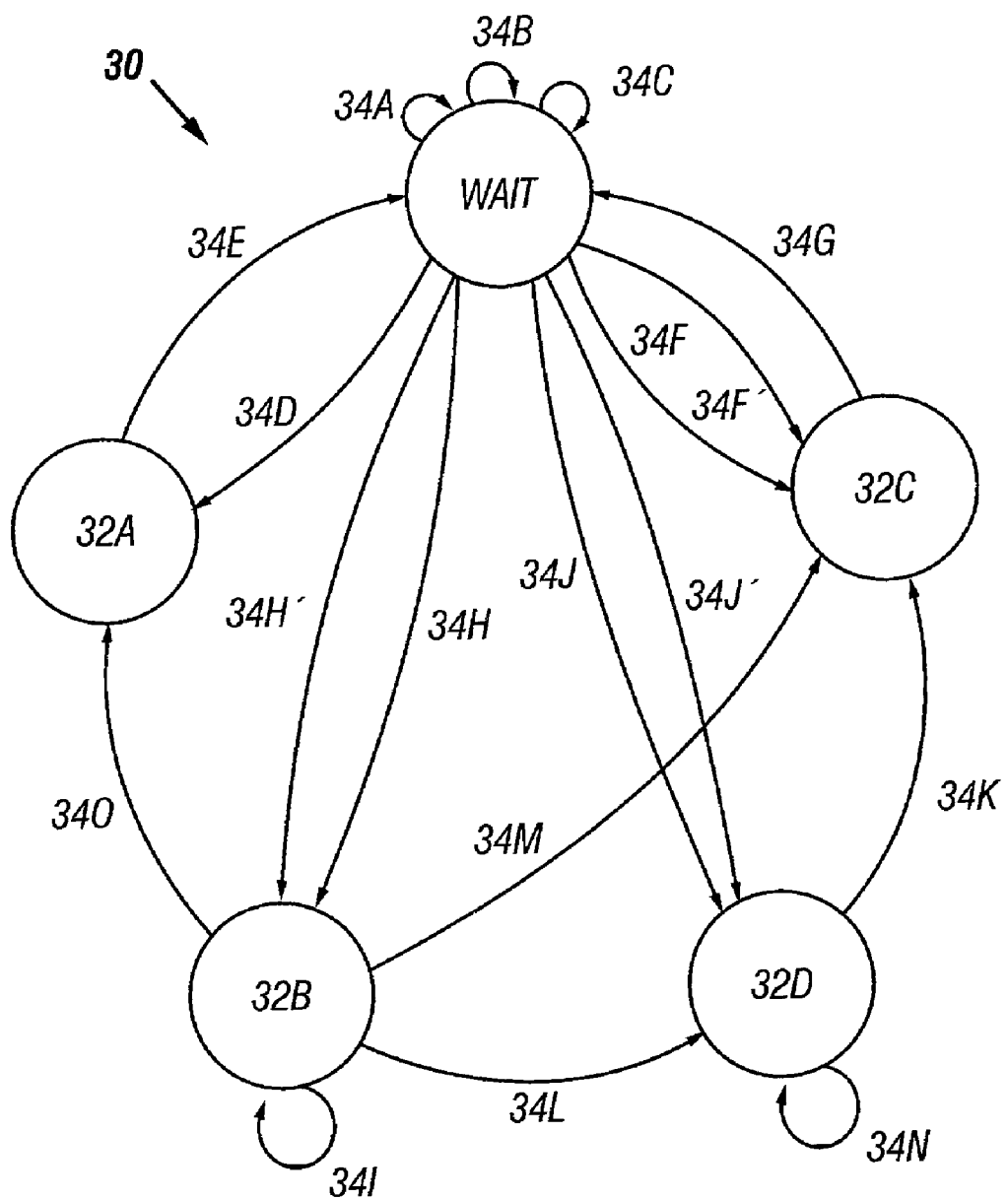
FIG. 3 illustrates an example state diagram for pushing multiple registers onto a stack.

FIG. 3 illustrates an example state diagram 30 for a state machine within MCI controller 5 for pushing multiple registers onto a stack. As described below, MCI controller 5 operates according to state diagram 30 in response to a push multiple instruction in order to push one or more registers.

While operating according to state diagram 30, MCI controller 5 may assert one or more MCI signals 7 including a PUSH_DREG signal, which directs decoder 12 to generate pipeline control signals for dispatching a push of a data register, and a PUSH_PREG signal, which directs decoder 12 to generate pipeline control signals for dispatching a push of a pointer register. In addition, MCI controller 5 may assert a D_REG_PRESELECT signal that initializes a counter whose count indicates which data register to push, or a P_REG_PRESELECT signal that initializes a counter whose count indicates which pointer register to push. MCI controller 5 may also assert a MCI_PRESTALL signal 17 that directs stall controller 8 to stall pipeline 4 on the following clock cycle.

The following table summarizes the conditions that cause the Push Multiple state machine in MCI controller 5 to transition from one state to another and the corresponding output signals that are asserted, where D is an instruction bit that indicates a data register is to be pushed, P is an instruction bit that indicates a pointer register is to be pushed, DR is an instruction field that indicates a starting data register to push, PR is an instruction field that indicates a starting pointer register to push, D_TAG represents the current data register being pushed, P_TAG represents the current pointer register being pushed, DMAX represents the maximum data register in the range of available data registers, PMAX represents the maximum pointer register in the range of available pointer registers:

TABLE 1

| PATH | CONDITIONS | OUTPUT |
|---|---|---|
| 34A | Not a push multiple instruction | None |
| 34B | D & !P & DR = DMAX | assert PUSH_DREG |
| 34C | !D & P & PR = PMAX | assert PUSH_PREG |
| 34D | D & !P & DR = DMAX − 1 | assert PUSH_DREG<br>assert D_REG_PRESELECT |
| 34E | none | assert PUSH_DREG |
| 34F | !D & P & PR = PMAX − 1 | assert PUSH_PREG<br>assert P_REG_PRESELECT |
| 34F' | D & P & DR = DMAX &<br>PR = PMAX | assert PUSH_DREG |
| 34G | none | assert PUSH_PREG |
| 34H | D & !P & DR < DMAX − 1 | assert PUSH_DREG<br>assert D_REG_PRESELECT<br>assert MCI_PRESTALL |
| 34H' | D & P & DR < DMAX | assert PUSH_DREG<br>assert D_REG_PRESELECT<br>assert MCI_PRESTALL |
| 34I | ((!P & D_TAG < DMAX − 1) \|<br>(P & D_TAG < DMAX)) | assert PUSH_DREG<br>assert D_REG_PRESELECT<br>assert MCI_PRESTALL |
| 34J | !D & P & PR < PMAX − 1 | assert PUSH_PREG<br>assert P_REG_PRESELECT<br>assert MCI_PRESTALL |
| 34J' | D & P & DR = DMAX &<br>PR < PMAX | assert PUSH_DREG<br>assert D_REG_PRESELECT<br>assert MCI_PRESTALL |
| 34K | PR = PMAX − 1 | assert PUSH_PREG<br>assert P_REG_PRESELECT |
| 34L | P & D_TAG = DMAX &<br>P_TAG < PMAX | assert PUSH_DREG<br>assert D_REG_PRESELECT<br>assert MCI_PRESTALL |
| 34M | P & D_TAG = DMAX &<br>P_TAG = PMAX | assert PUSH_DREG<br>assert D_REG_PRESELECT |
| 34N | P_TAG < PMAX − 1 | assert PUSH_PREG<br>assert P_REG_PRESELECT<br>assert MCI_PRESTALL |
| 34O | D_TAG = DMAX − 1 & !P | assert PUSH_DREG<br>assert D_REG_PRESELECT |

Initially, MCI controller 5 starts in the WAIT state until an instruction is fetched by fetch unit 11 and decoded by decode unit 12. If the instruction is not a PushPopMultiple instruction, the MCI controller 5 returns to the WAIT state as indicated by path 34A.

If the instruction is a PushPopMultiple instruction, but only instructs processor 2 to push a single data register, the state machine asserts a PUSH_DREG signal and returns to the WAIT state via path 34B. If the instruction is a PushPopMultiple instruction that instructs processor 2 to push a single pointer register, the state machine asserts the PUSH_PREG signal and returns to the WAIT state via path 34C.

If the instruction specifies pushing two data registers or two pointer registers, state machine changes states to the state 32A or state 32C, respectively. The state machine transitions to these states via path 34D or 34F, and asserts the PUSH_DREG signal while transitioning to the state 32A or the PUSH_PREG signal while transitioning to the state 32C. In addition, while transitioning along path 34D, the state machine asserts the D_REG_PRESELECT signal initializing the counter that indicates which data registers to push. Similarly, while transitioning along path 34F, the state machine asserts the P_REG_PRESELECT signal initializing the counter that indicates which pointer registers to push.

The state machine returns to the WAIT state from the state 32A via path 34E. During this transition, MCI controller 5 again asserts PUSH DREG and deasserts D_REG_PRESELECT, causing decode unit 12 to dispatch the push of another data register. Similarly, the state machine returns to the WAIT state from the state 32C via path 34G. During this transition, MCI controller 5 asserts PUSH_PREG and deasserts P_REG_PRESELECT, causing execution unit 15 to push another pointer register.

For a PushPopMultiple instruction that requires instruction decode unit 12 to dispatch the push of three or more data registers, the state machine transitions from the WAIT state to the state 32B via path 34H. During the transition, MCI controller 5 asserts PUSH_DREG signal and asserts D_REG_PRESELECT, causing execution unit 15 to push a first data register. In addition, MCI controller 5 asserts MCI_PRESTALL signal causing stall controller 8 to stall one or more stages of pipeline 4 on the following clock. For example, in one embodiment, stall controller 8 asserts STALL_DEC to stall the decode stage of pipeline 4. Once in the state 32B, MCI controller 5 continues to push data registers until two registers remain to be pushed. For example, if the instruction called for six data registers to be pushed, MCI controller 5 traverses path 34I three times, pushing a data register each time, until the current data register to be pushed equals the maximum available data register (DMAX) minus one, i.e., when two data registers remain to be pushed.

While traversing path 34I, MCI controller 5 asserts the PUSH_DREG signal, the D_REG_PRESELECT signal and the MCI_PRESTALL signal. When two data registers remain to be pushed, MCI controller 5 transitions to the state 32A via path 34O while pushing one of the remaining data registers. During this transition, MCI controller 5 deasserts MCI_PRESTALL. Instruction decoder 12 receives a new instruction on the cycle after MCI controller 5 has traversed path 34E and has pushed the remaining data register.

Similarly, for a PushPopMultiple instruction that requires instruction decode unit 12 to dispatch the push of three or more pointer registers, the state machine transitions from the WAIT state to the state 32D via path 34J. During the transition, MCI controller 5 asserts PUSH_PREG signal and asserts P_REG_PRESELECT, causing execution unit 15 to push a first pointer register. In addition, MCI controller 5 asserts MCI PRESTALL signal causing stall controller 8 to stall one or more stages of pipeline 4. In the state 32D, MCI controller 5 pushes pointer registers by traversing path 34N until two pointer registers remain to be pushed. While traversing path 34N, MCI controller 5 asserts the PUSH DREG signal, the D_REG_PRESELECT signal and the MCI_PRESTALL signal. Once two data registers remain to be pushed, MCI controller 5 transitions to the state 32C via path 34K while pushing a pointer register. During this transition, MCI controller 5 deasserts MCI_PRESTALL. In this manner, pipeline 4 resumes operation on the next clock cycle after MCI controller 5 has transitioned to the WAIT state via path34G and has pushed the remaining pointer register.

In addition to the above functionality, a PushPopMultiple instruction may specify multiple data registers and multiple pointer registers. Generally, state machine 30 is designed to first push the data registers, followed by the pointer registers, although the invention is not limited as such.

For a Push Multiple instruction that specifies pushing a single data register and a single pointer register, MCI controller 5 transitions to the state 32C via path 34F' and asserts the PUSH DREG signal to push the data register. Next, MCI controller 5 transitions back to the WAIT state via path 34G and pushes the pointer register.

For a Push Multiple that specifies pushing one data register and more than one pointer register, MCI controller 5 transitions to the state 32D via path 34J' and asserts the PUSH_ DREG signal, the D_REG_PRESELECT signal and the MCI_PRESTALL signal to push the data register. Next, MCI controller 5 pushes all but two of the pointer registers by traversing path 34N, pushes a pointer register by traversing path 34K and pushes the last pointer register and returning the WAIT state by traversing path 34G.

Finally, for a PushPopMultiple instruction that specifies pushing multiple data registers and at least one pointer registers, MCI controller 5 transitions to the state 32B via path 34H' and asserts the PUSH_DREG signal, the D_REG_PRE-SELECT signal and the MCI_PRESTALL signal to push a first data register. Next, MCI controller 5 pushes all but one of the data registers by traversing path 34I'. If the instruction specifies a single pointer register to be pushed, MCI controller 5 pushes the final data register by traversing path 34M and pushing the single pointer register by traversing path 34G. Otherwise, MCI controller 5 pushes the final data register by traversing path 34L and pushes the multiple pointer registers by traversing paths 34N if necessary, followed by 34K and 34G.

Figure 4:
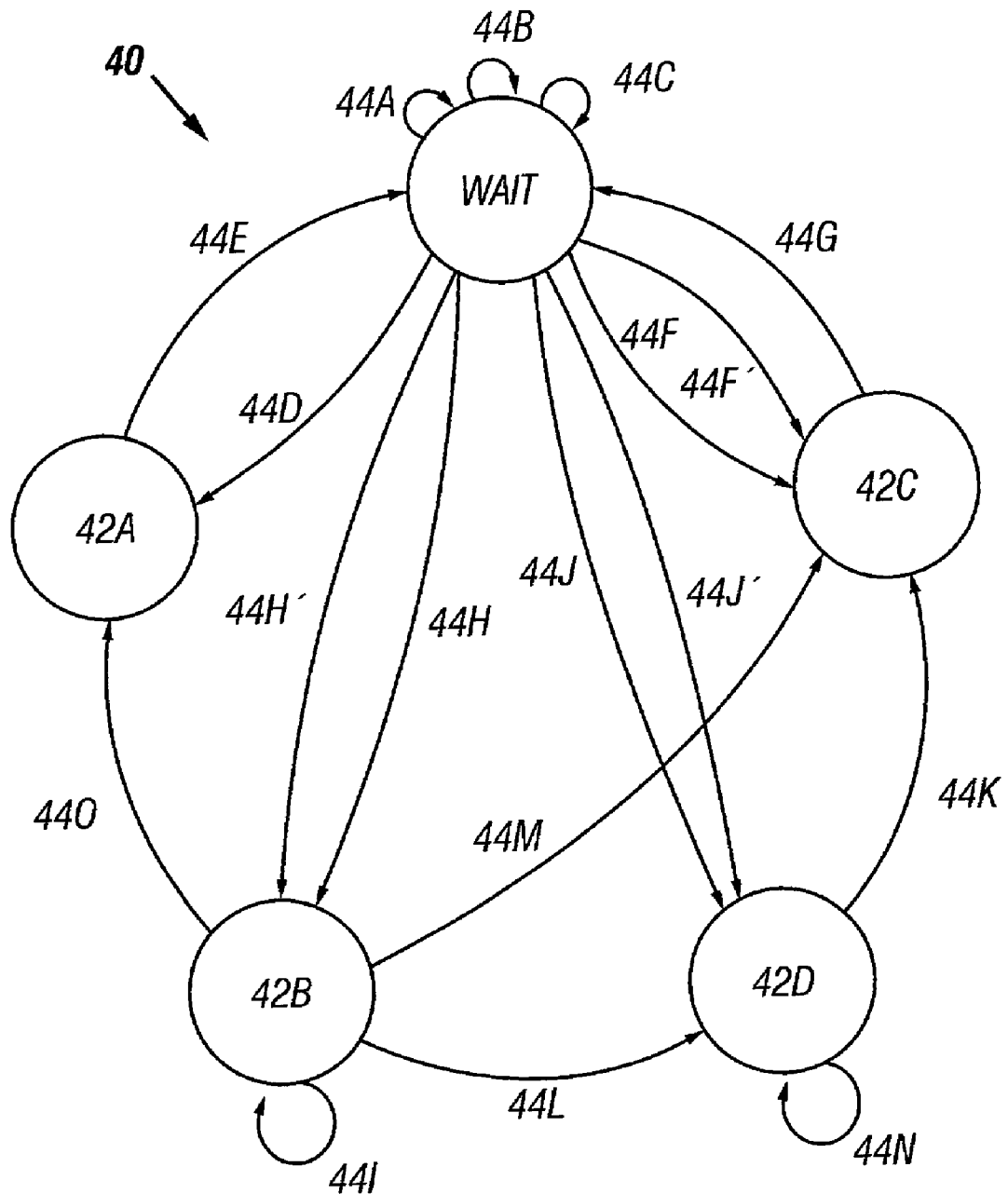
FIG. 4 illustrates an example state diagram for popping multiple registers off a stack.

FIG. 4 illustrates an example state diagram 40 of a state machine within MCI controller 5 for popping multiple registers from a stack. MCI controller 5 operates according to state diagram 40 in response to a PushPopMultiple instruction that specifies one or more registers to be popped from a stack in memory. While operating according to state diagram 40, MCI controller 5 may assert one or more MCI signals 7 including a POP_DREG signal, which directs pipeline 4 to pop a data register, and POP_PREG signal, which directs pipeline 4 to pop a pointer register. In addition, MCI controller 5 may assert a D_REG_PRESELECT signal initializing a counter that indicates which data register to pop or a P_REG_PRE-SELECT signal initializing a counter that indicates which pointer register to pop. MCI controller 5 may also assert MCI_PRESTALL signal to stall pipeline 4 on the following clock cycle.

The following table summarizes the conditions that cause MCI controller 5 to transition between state of state diagram 40 and the corresponding output signals that are asserted, where D is an instruction bit that indicates a data register is to be popped, P is an instruction bit that indicates a pointer register is to be popped, DR is an instruction field indicating the last data register to pop from the stack, PR is a instruction field indicating the last pointer register to pop from the stack, D_TAG represents the current data register being popped, P_TAG represents the current pointer register being popped, DMAX represents the maximum data register in the range of available data registers and PMAX represents the maximum pointer register in the range of available pointer registers:

TABLE 2

| PATH | CONDITIONS | OUTPUT |
|---|---|---|
| 44A | Not a pop multiple instruction | None |
| 44B | P & !D & PR = PMAX | assert POP_PREG |
| 44C | !P & D & DR = DMAX | assert POP_DREG |
| 44D | P & !D & PR = PMAX − 1 | assert POP_PREG assert P_REG_PRESELECT |
| 44E | none | assert POP_PREG |
| 44F | !P & D & DR = DMAX − 1 | assert POP_DREG assert D_REG_PRESELECT |
| 44F' | D & P & DR = DMAX & PR = PMAX | assert POP_PREG |
| 44G | none | assert POP_DREG |
| 44H | P & !D & PR < PMAX − 1 | assert POP_PREG assert P_REG_PRESELECT assert MCI_PRESTALL |
| 44H' | D & P & PR < PMAX | assert POP_PREG assert P_REG_PRESELECT assert MCI_PRESTALL |
| 44I | ((!D & P_TAG > PR + 1) | (D & P_TAG > PR)) | assert POP_PREG assert P_REG_PRESELECT assert MCI_PRESTALL |
| 44J | !P & D & DR < DMAX − 1 | assert POP_DREG assert D_REG_PRESELECT assert MCI_PRESTALL |
| 44J' | D & P & PR = PMAX & DR < DMAX | assert POP_PREG assert P_REG_PRESELECT assert MCI_PRESTALL |
| 44K | D_TAG = DR + 1 | assert POP_DREG assert D_REG_PRESELECT |
| 44L | D & P_TAG = PR & DR < DMAX | assert POP_PREG assert P_REG_PRESELECT assert MCI_PRESTALL |
| 44M | D & P_TAG = PR & DR = DMAX | assert POP_PREG assert P_REG_PRESELECT |
| 44N | D_TAG > DR + 1 | assert POP_DREG assert D_REG_PRESELECT assert MCI_PRESTALL |
| 44O | P_TAG = PR + 1 & !D | assert POP_PREG assert P_REG_PRESELECT |

Initially, MCI controller 5 starts in the WAIT state until an instruction is fetched by fetch unit 11 and decoded by decode unit 12. If the instruction is not a PushPopMultiple instruction, MCI controller 5 returns to the WAIT state as indicated by path 44A.

If the instruction is a PushPopMultiple instruction that directs processor 2 to pop a single pointer register and no data registers, MCI controller 5 asserts a POP_DREG signal and returns to the WAIT state via path 44B. If the instruction is a Pop Multiple command and instructs processor 2 to pop a single data register, MCI controller 5 asserts the POP_DREG signal and returns to the WAIT state via path 44C.

If the instruction specifies popping two pointer registers or two data registers, MCI controller 5 changes states to the state 42A or state 42C, respectively, via paths 44D or 44F. MCI controller 5 asserts the POP_PREG signal while transitioning to the state 42A or the POP_DREG signal while transitioning to the state 42C. In addition, while transitioning along path 44D, MCI controller 5 asserts the P_REG_PRESELECT signal initializing a counter whose count indicates which pointer registers to pop. Similarly, while transitioning along path 44F, MCI controller 5 asserts the D_REG_PRESELECT signal, initializing a counter whose count indicates which data registers to pop.

After popping the first of the two pointer registers, MCI controller 5 returns to the WAIT state from the state 42A via path 44E. During this transition, MCI controller 5 again asserts POP_PREG and deasserts P_REG_PRESELECT, causing execution unit 15 to pop another pointer register. Similarly, after popping the first of the two data registers, MCI controller 5 returns to the WAIT state from the state 42C via path 44G. During this transition, MCI controller 5 asserts POP_DREG and deasserts D_REG_PRESELECT, causing execution unit 15 to pop another data register.

For a Pop Multiple instruction that requires instruction decode unit 12 to dispatch the pop of three or more pointer registers, MCI controller 5 transitions from the WAIT state to the state 42B via path 44H. During the transition, MCI controller 5 asserts POP_PREG signal and asserts P_REG_PRESELECT, causing execution unit 15 to pop a first pointer register. In addition, MCI controller 5 asserts MCI_PRESTALL signal causing stall controller 8 to stall one or more stages of pipeline 4 on the following clock. Once in the state 42B, MCI controller 5 continues to pop pointer registers until only two pointer registers remain to be popped. For example, if the instruction called for six pointer registers to be popped, MCI controller 5 traverses path 44I three times, popping a pointer register each time, until the current pointer register to be popped equals the maximum available pointer register (PMAX) minus one, i.e., when two pointer registers remain to be popped.

While traversing path 44I, MCI controller 5 asserts the POP_PREG signal, the P_REG_PRESELECT signal and the MCI_PRESTALL signal. When two pointer registers remain to be popped, MCI controller 5 transitions to the state 42A via path 44O while popping one of the remaining pointer registers. During this transition, MCI controller 5 deasserts MCI_PRESTALL. Instruction decoder 12 receives a new instruction on the cycle after MCI controller 5 has traversed path 44E and has popped the remaining pointer register.

Similarly, for a PushPopMultiple instruction that requires instruction decode unit 12 to dispatch the pop of three or more data registers and no pointer registers, MCI controller 5 transitions from the WAIT state to the state 42D via path 44J. During the transition, MCI controller 5 asserts POP_DREG signal and asserts D_REG_PRESELECT, causing execution unit 15 to pop a first pointer register. In addition, MCI controller 5 asserts MCI_PRESTALL signal causing stall controller 8 to stall one or more stages of pipeline 4. In state 42D, MCI controller 5 pops data registers by traversing path 44N until two data registers remain to be popped. While traversing path 44N, MCI controller 5 asserts the POP DREG signal, the D_REG_PRESELECT signal and the MCI_PRESTALL signal. Once two data registers remain to be popped, MCI controller 5 transitions to the state 42C via path 44K while popping a data register. During this transition, MCI controller 5 deasserts MCI_PRESTALL. MCI controller 5 then transitions to the WAIT state via path 44G and pops the remaining data register.

In addition to the above functionality, a PushPopMultiple instruction may specify multiple data registers and multiple pointer registers to be popped. Generally, state machine 30 is designed to first pop the pointer registers, followed by the data registers, although the invention is not limited as such.

For a PushPopMultiple instruction that specifies popping a single pointer register and a single data register, MCI controller 5 transitions to the state 42C via path 44F' and asserts the POP_PREG signal to pop the pointer register. Next, MCI controller 5 transitions back to the WAIT state via path 44G, asserts the POP_DREG signal and pops the data register.

For a PushPopMultiple instruction that specifies popping one pointer register and more than one data register, MCI controller 5 transitions to the state 42D via path 44J' and asserts the POP PREG signal, the P_REG_PRESELECT signal and the MCI_PRESTALL signal to pop the pointer register. Next, MCI controller 5 pops all but two of the data registers by traversing path 44N, pops a data register by traversing path 44K and pops the last data register and returns to the WAIT state by traversing path 44G.

Finally, for a Pop Multiple that specifies popping multiple pointer registers and at least one data registers, MCI controller 5 transitions to the state 42B via path 44H' and asserts the POP_PREG signal and the P_REG_PRESELECT signal to pop a first pointer register. Next, MCI controller 5 pops all but one of the pointer registers by traversing path 44I. If the instruction specifies a single data register to be popped, MCI controller 5 pops the final pointer register by traversing path 44M and popping the single data register by traversing path 44G. Otherwise, MCI controller 5 pops the final pointer register by traversing path 44L and pops the multiple data registers by traversing paths 44N if necessary, followed 44K and 44G.

Additional examples of instructions that direct pipelined processor 2 to perform multiple operations according to the invention are the Link instruction and the Unlink instruction. The Link instruction is typically used when invoking a subroutine and causes pipeline processor 4 to push a return address for a subroutine on a stack, push a frame pointer on the stack, move the stack pointer to the frame pointer and update the stack pointer based on a frame size for the subroutine, as specified by the instruction. The Unlink instruction is used when exiting the subroutine and causes pipelined processor 2 to restore the return address from the stack, restore the stack pointer and restore the frame pointer from the stack.

Figure 5:
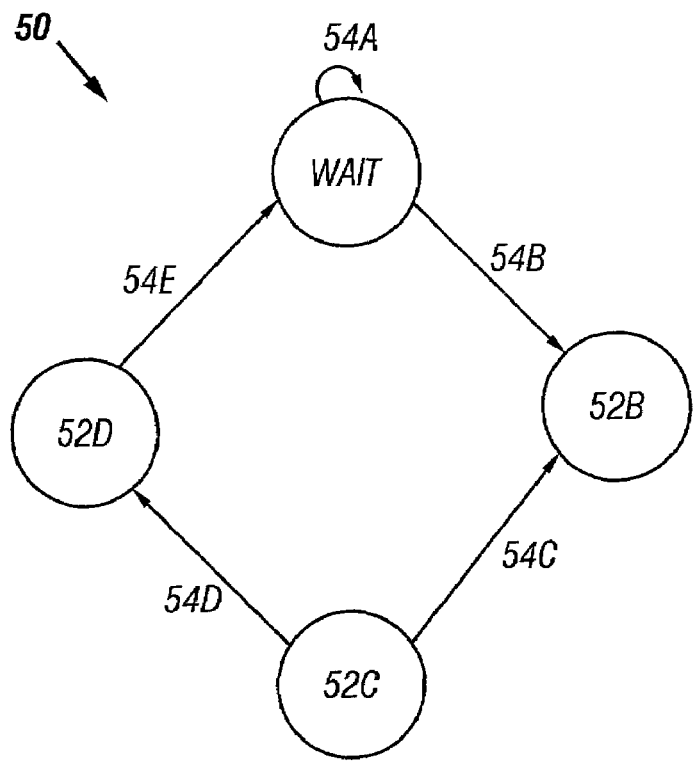
FIG. 5 illustrates an example state diagram for execution of a Link instruction.

The following examples illustrate the Link and Unlink instructions:

link 1234;

unlink;

FIG. 5 illustrates an example state diagram 50 for a state machine within MCI controller 5 for carrying out the operations of the Link command. While operating according to state diagram 50, MCI controller 5 may assert one or more MCI signals 7 directing pipeline 4 to perform a corresponding operation. In addition, MCI controller 5 may assert the MCI_PRESTALL signal to stall pipeline 4.

The following table summarizes the output signals that are asserted while MCI controller 5 transitions through state diagram 50:

TABLE 3

| PATH | OUTPUT SIGNAL |
| --- | --- |
| 54A | None |
| 54B | PUSH_RTS, MCI_PRESTALL |
| 54C | PUSH_FP, MCI_PRESTALL |
| 54D | MOVE_SP_TO_FP |
| 54E | UPDATE_SP |

If the present instruction is not a link command, then state machine directs MCI controller 5 to return to the WAIT state via path 54A. If the instruction is a Link instruction, MCI controller 5 transitions to stage 52B via path 54B and asserts the PUSH_RTS signal, causing decode unit 12 to dispatch a push of the return address on the stack. In addition, MCI controller 5 asserts MCI_PRESTALL to stall pipeline 4 on the following cycle.

Next, MCI controller 5 transitions to state 52C via path 54C, asserts PUSH_FP, causing decode unit 12 to dispatch a push of the frame pointer register onto the stack and asserts MCI_PRESTALL to stall pipeline 4 on the following cycle. MCI controller 5 then transitions to state 52D via path 54D and asserts MOVE_SP_TO_FP, causing instruction decode unit 12 to dispatch a move of the contents of the stack pointer register to the frame pointer register. Finally, MCI controller 5 transitions to the WAIT state via path 54E and asserts UPDATE SP, causing instruction decode unit 12 to dispatch a subtract of the frame size from the stack pointer as specified by the instruction.

Figure 6:
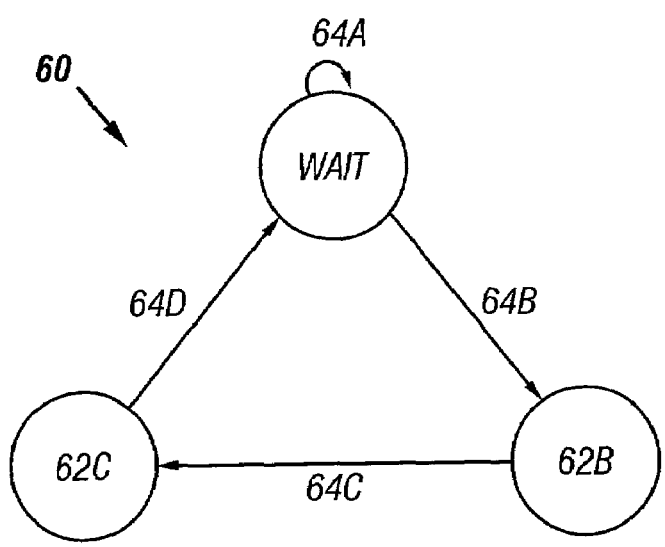
FIG. 6 illustrates an example state diagram for execution of an Unlink instruction.

FIG. 6 illustrates an example state diagram 60 for a state machine within MCI controller 5 for carrying out the operations of the Unlink command. The following table summarizes the output signals that are asserted while MCI controller 5 transitions through state diagram 60:

TABLE 4

| PATH | OUTPUT SIGNAL |
| --- | --- |
| 64A | None |
| 64B | LOAD_RTS, MCI_PRESTALL |
| 64C | LOAD_SP |
| 64D | UPDATE_FP |

If the present instruction is not an Unlink command, then state machine 60 directs MCI controller 5 to return to the WAIT state via path 64A. If the instruction is an Unlink instruction, MCI controller 5 transitions to state 62B via path 64B and asserts the LOAD_RTS signal, causing instruction decode unit 12 to assert control signals that cause a return address to be to retrieved from the stack as follows: RETS= [FP +4]. In addition, MCI controller5 asserts MCI_PRESTALL to stall pipeline 4 on the following cycle.

Next, MCI controller 5 transitions to state 62C via path 64C and asserts LOAD_SP, causing instruction decode unit 12 to assert control signals that cause the setting of the stack pointer as follows: SP=FP+8.

Finally, MCI controller 5 transitions back to the WAIT state via path 64D and asserts UPDATE_FP, causing instruction decode unit 12 to assert control signals that cause the frame pointer to be loaded from the stack as follows: FP=[FP].

Figure 7:
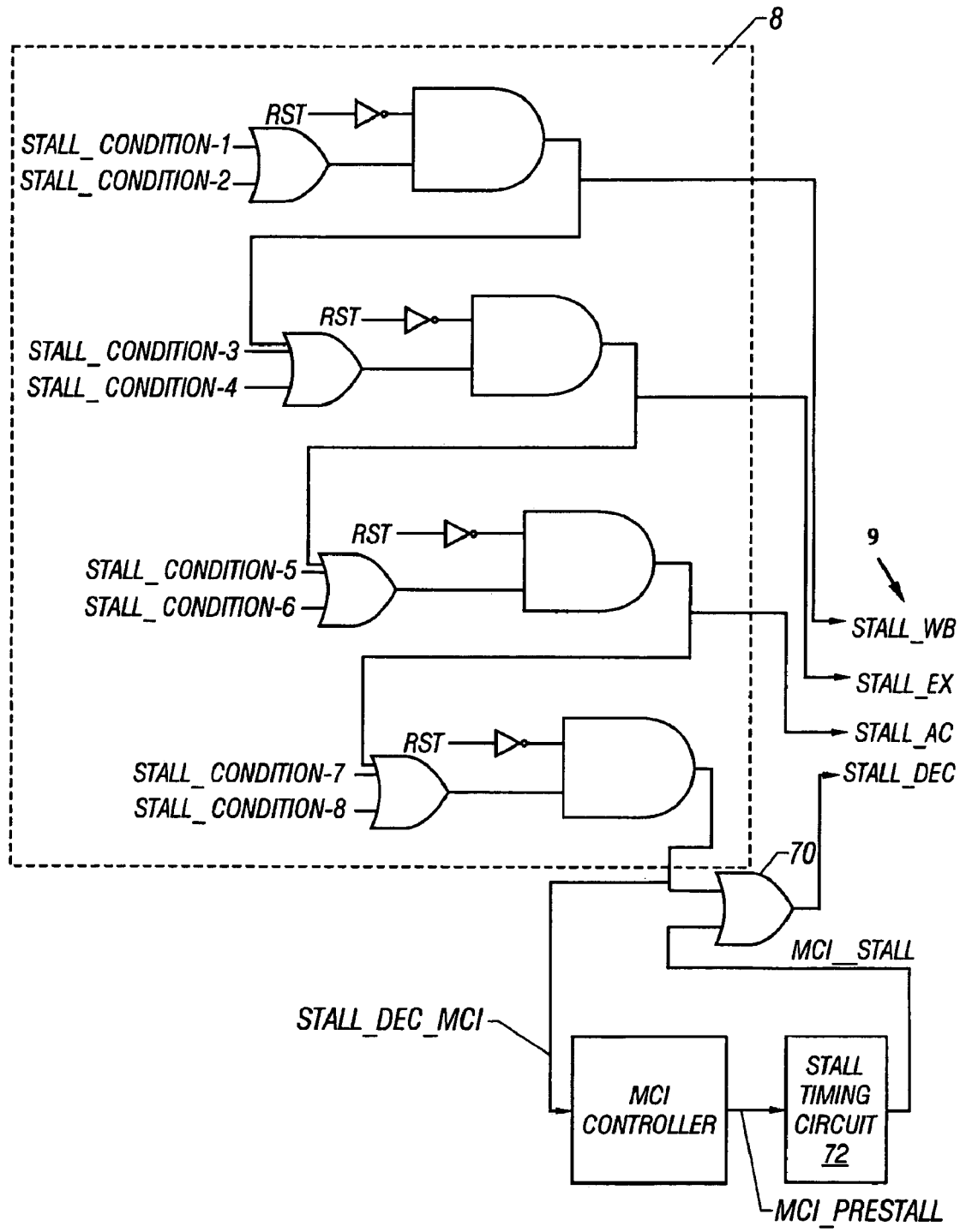
FIG. 7 is a schematic diagram illustrating an example embodiment of a stall controller.

FIG. 7 is a schematic diagram illustrating an example embodiment of a portion of stall controller 8.

Stall controller 8 may receive a number of input signals, such as stall_condition_1 through stall_condition_8, which may be asserted when a respective stall condition has been detected. The input signals are for exemplary purposes only; for example, stall controller 8 may receive any number of different stall conditions for the various stages of pipeline 4.

In response to the input stall condition signals, stall controller 8 may generate stall signals 9 to stall pipeline 4. Stall controller 8 may produce a plurality of stall signals 9, which correspond to the stages of pipeline 4. For example, when either stall_condition_1 or stall_condition_2 is asserted, and processor 2 is not in reset, stall controller 8 may assert the stall_wb output signal, resulting in a stall of the WB stage of pipeline 4. Notably, the stall_wb output signal is used to generate stall output signals for earlier stages of pipeline 4, such as the stall_ex output signal. More specifically, stall controller 8 asserts the stall_ex output signal when stall_condition_3, stall_condition_4 or stall_wb is asserted and processor 2 is not in reset. In this manner, a stall in the WB stage forces a stall in the EX stage. Stall controller 8 similarly generates the stall_ac and stall_dec signals based on independent hazard conditions as well as stalls in later stages of pipeline 4.

When conditions arise that cause the decode stage to stall, stall controller 8 asserts the stall_dec_mci signal, which causes MCI controller 5 to stall. More specifically, MCI controller 5 does not transition from its current state when stall_dec_mci is asserted.

Stall timing circuit 72 of stall controller 8 receives the MCI_PRESTALL signal from MCI controller 5 and, in response, asserts the MCI_STALL signal. OR gate 70 receives the MCI_STALL signal provided by stall timing circuit 72 and asserts the STALL_DEC signal, thereby stalling the decode stage and the earlier stages of pipeline 4.

Figure 8:
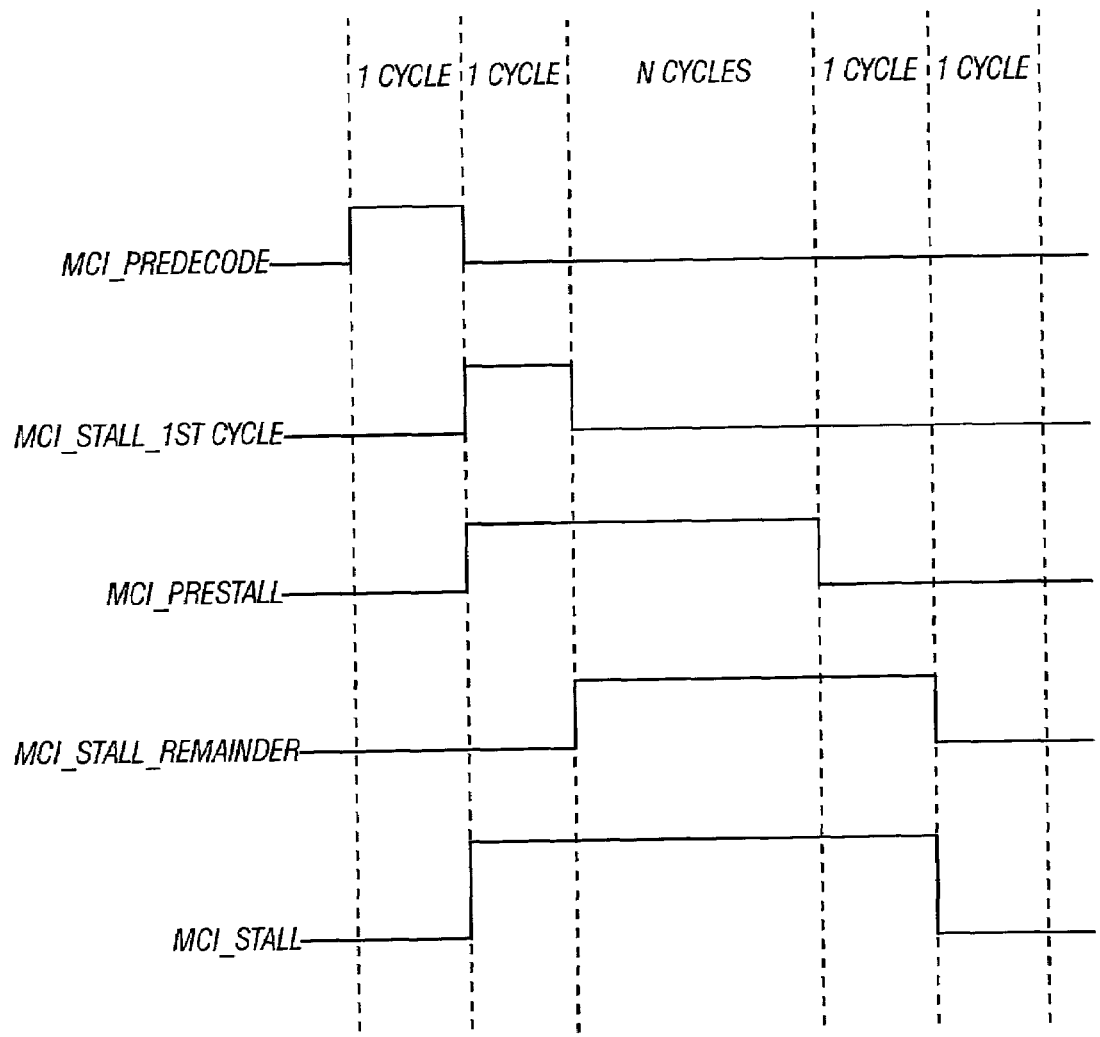
FIG. 8 is a timing diagram for a stall generator.

FIG. 8 is a timing diagram illustrating that stall controller 8 may take advantage of detecting an MCI instruction prior to the decode stage of pipeline 4 in order to increase performance of pipeline 4. In one embodiment, a pre-decoder in the IF stage of pipeline 4 decodes an MCI instruction one stage earlier than the decode stage. If an MCI instruction is pre-decoded, the pre-decoder asserts the MCI_PREDECODE signal. On the following clock when the MCI instruction moves to the decode stage, the MCI_STALL_1ST_CYCLE signal is asserted, which is a flopped version of the MCI_PREDECODE signal. STALL controller 5 provides the MCI_STALL signal based on the ORing of the MCI_STALL_FIRST_CYCLE signal and the MCI_STALL_REMAINDER signal. The MCI_STALL_REMAINDER signal is a flopped version of MCI_PRESTALL that is controlled by the state logic of MCI controller 5 as described above.

Figure 9:
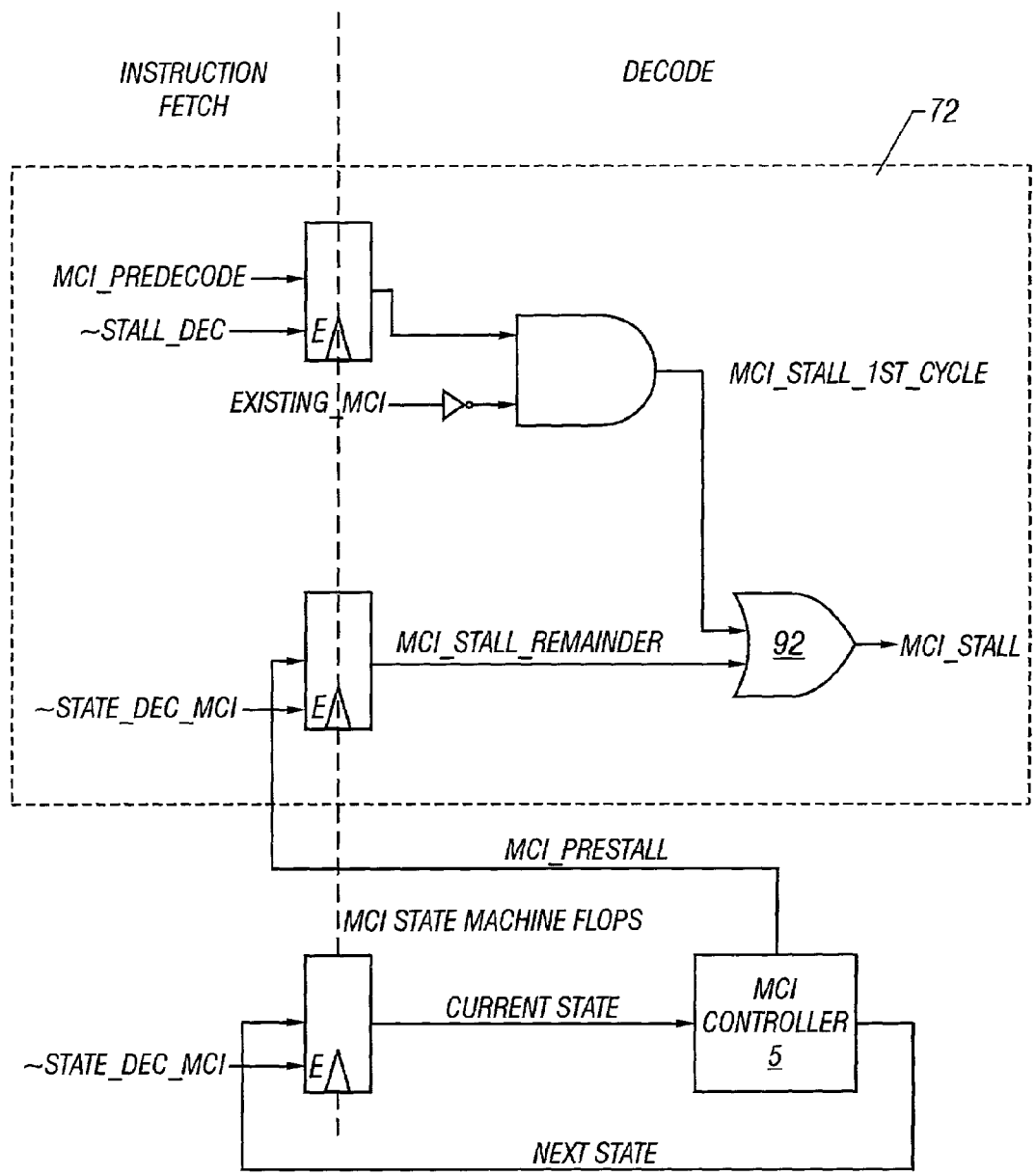
FIG. 9 is a schematic diagram of an example circuit for generating a stall signal for multi-cycle instructions.

FIG. 9 is a schematic diagram of an example stall timing circuit 72 for generating MCI_STALL from the MCI_PREDECODE signal received from the pre-decoder and the MCI_PRESTALL signal received from MCI controller 5. During the first cycle that an MCI instruction is in the decode stage, OR gate 92 asserts MCI_STALL when the flopped version of MCI_PREDECODE is asserted and there is no current MCI being executed. For MCI instructions that require more than one stall cycle, stall timing circuit 72 generates the remaining stall cycles based upon the MCI_PRESTALL signal received from MCI controller 5.

Figure 10:
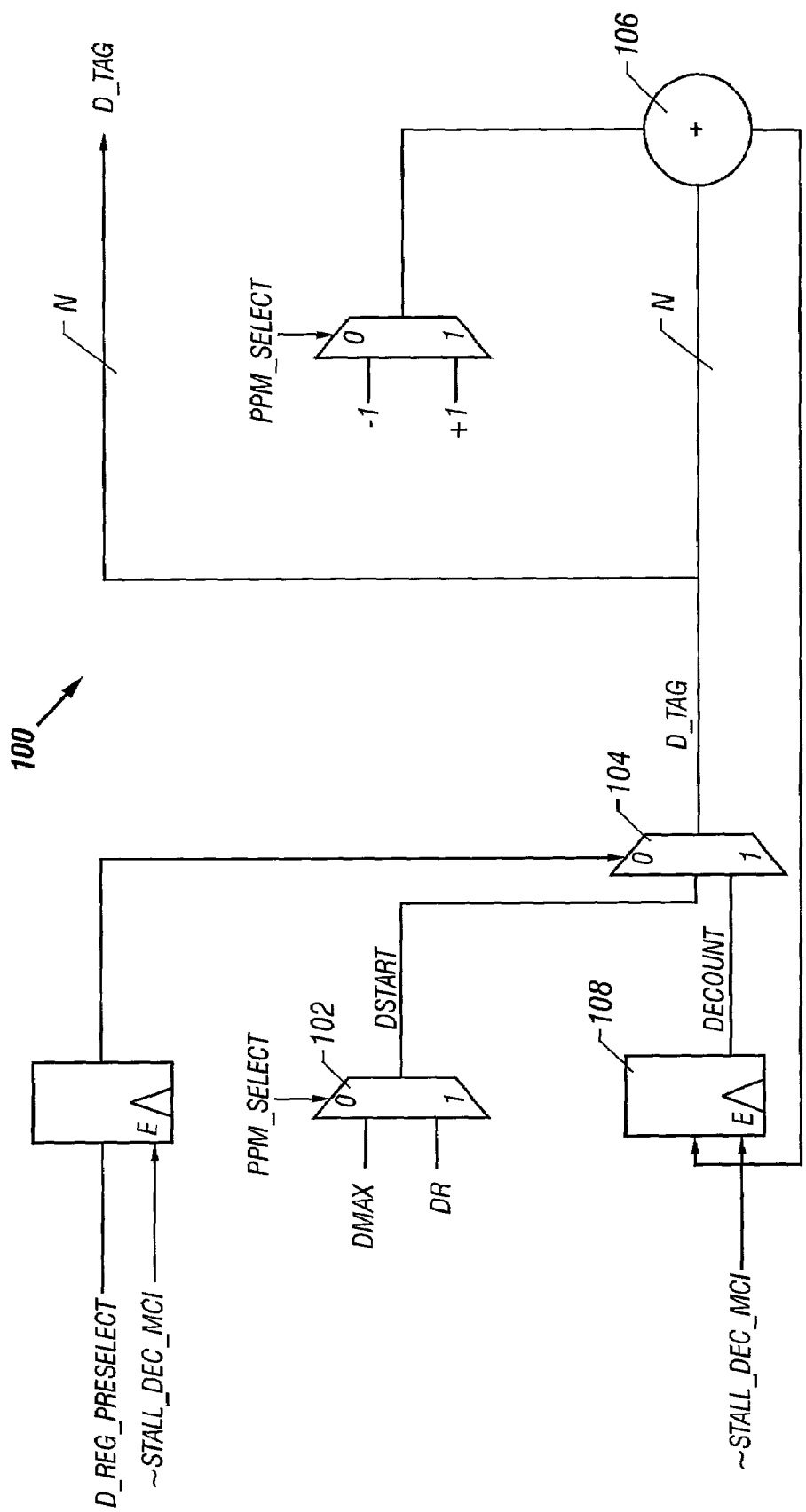
FIGS. 10 and 11 are schematic diagrams of example address generation circuits.

FIG. 10 is a schematic of an example data register address generation circuit 100 for generating a data register value (D_TAG) representing the current data register to be pushed or popped. D_TAG may include a plurality of data lines, such as three data lines, capable of indicating a range of data register.

For push operations, circuit 100 counts up from a starting data register to the maximum data register. For pop operations, circuit 100 counts down through the range of registers to the last data register. More specifically, on the first cycle, multiplexer 102 selects between a maximum data register (DMAX) or a starting data register from an instruction field (DR), such as data register five, based on whether PPM SELECT, which is asserted for push operations and deasserted for pop operations.

The D_REG_PRESELECT output signal provided by MCI controller 5 enables multiplexer 104 to select the output of multiplexer 102 for the first cycle of an MCI instruction and the output of storage circuit 108 for the remaining cycles. The output of multiplexer 104, D_TAG, is incremented or decremented by adder 106, depending PPM_SELECT, and fed back to storage circuit 108 The output signal, D_TAG, is fed to instruction decode unit 12 of pipeline 4 for pushing or popping registers and is also fed back as an input to the state control logic of MCI controller 5.

Figure 11:
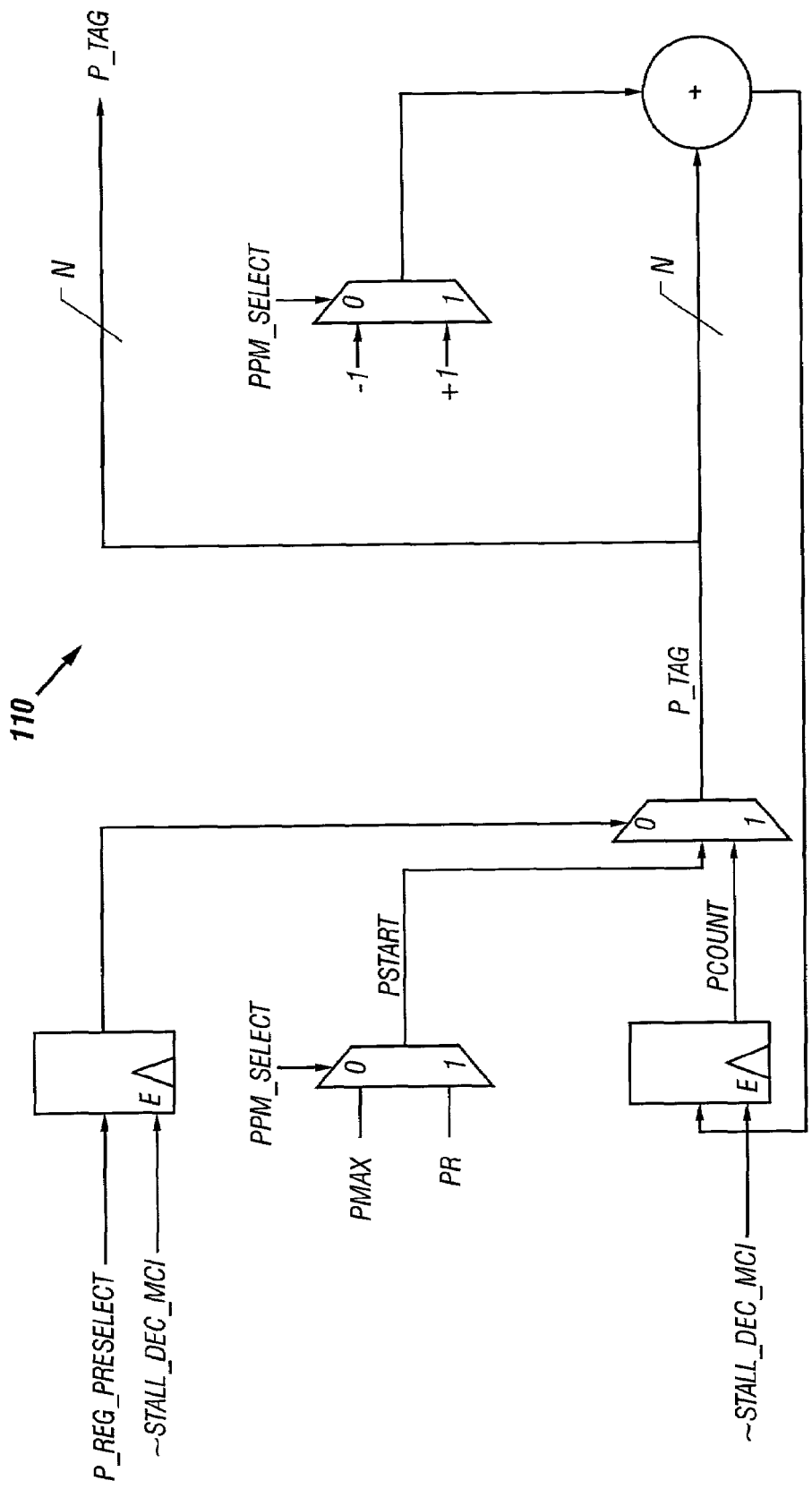

FIG. 11 is a schematic of an example pointer register address generation circuit 110 for outputting a pointer register value (P_TAG) representing the current pointer register to be pushed or popped. Similar to circuit 100 of FIG. 10, circuit 110 counts down through the range of registers for pop operations and counts up from a starting pointer register for push operations.

Various embodiments of the invention have been described. For example, a pipelined processor has been described that includes a reset unit that provides an output reset signal to at least one stage of an execution pipeline. The reset unit handles reset requests, such as hard resets, soft resets and emulation resets, as a reset event having an assigned priority.

The processor can be implemented in a variety of systems including general purpose computing systems, digital processing systems, laptop computers, personal digital assistants (PDA's) and cellular phones. In such a system, the processor may be coupled to a memory device, such as a Flash memory device or a static random access memory (SRAM), that stores an operating system or other software applications. These and other embodiments are within the scope of the following claims.

What is claimed is:

1. A method comprising:
receiving a multi-cycle instruction in a pipelined processor;
detecting the multi-cycle instruction prior to a decode stage within a pipeline of the pipelined processor;
stalling the multi-cycle instruction in the decode stage; and
issuing a plurality of instructions to subsequent stages in the pipeline while the multi-cycle instruction is stalled.

2. The method of claim 1 further comprising:
deasserting a pre-stall signal at least two cycles prior to the completion of the multi-cycle instruction; and
deasserting a stall signal at least one cycle prior to the completion of the multi-cycle instruction.

3. The method of claim 1, wherein issuing a plurality of instructions includes issuing the same instruction a number of times when the multi-cycle instruction is stalled.

4. The method of claim 3, wherein issuing the same instruction a number of times includes issuing a push instruction.

5. The method of claim 1, wherein issuing a plurality of instructions includes issuing a number of different instructions when the multi-cycle instruction is stalled.

6. The method of claim 5, wherein issuing a number of different instructions includes issuing instructions to push a return address for a subroutine on a stack, push a frame pointer on the stack, move a stack pointer to the frame pointer and update the stack pointer based on a frame size for the subroutine.

7. The method of claim 1, wherein issuing a plurality of instructions includes issuing instructions according to a state machine.

8. The method of claim 1, wherein stalling the multi-cycle instruction comprises asserting a stall signal when the multi-cycle instruction specifies at least one of popping and pushing more than one register.

9. A method comprising:
receiving a multi-cycle instruction directing a pipelined processor to pop one or more registers from a stack;
detecting the multi-cycle instruction prior to a decode stage within a pipeline of the pipelined processor;
stalling the multi-cycle instruction in the decode stage; and
issuing a plurality of instructions to subsequent stages in the pipeline according to a state machine.

10. The method of claim 9, wherein when the multi-cycle instruction specifies popping two registers, issuing a plurality of instructions comprises:
transitioning from a first state to a second state and issuing an instruction a first pop instruction; and
transitioning from the second state back to the first state and issuing a second pop instruction.

11. The method of claim 9, wherein when the multi-cycle instruction specifies popping three or more registers from a stack, and issuing a plurality of instructions comprises:
transitioning from a first state to a second state and issuing an instruction a first pop instruction;
issuing a number of pop instructions until two registers remain to be popped;
transitioning from the second state to a third state and issuing another pop instruction to pop the second to last register; and
transitioning from the third state back to the first state and issuing a pop instruction to pop the last register.

12. The method of claim 9, wherein when the multi-cycle instruction specifies popping multiple data registers and multiple pointer registers from a stack, and issuing a plurality of instructions comprises:
transitioning from a first state to a second state and issuing an instruction a first instruction to pop a pointer register;
issuing a number of pop instructions until one pointer register remains to be popped;
transitioning from the second state to a third state and issuing another pop instruction to pop the final pointer register;
issuing a number of pop instructions until two data registers remains to be popped;
transitioning from the third state to a fourth state and issuing a pop instruction to pop the second to last data register; and
transitioning from the fourth state back to the first state and issuing a pop instruction to pop the last data register.

13. The method of claim 9, wherein stalling the multi-cycle instruction comprises asserting a stall signal when the multi-cycle instruction specifies popping more than one register.

14. A method comprising:
receiving a multi-cycle instruction directing a pipelined processor to push one or more registers on a stack;
detecting the multi-cycle instruction prior to a decode stage within a pipeline of the pipelined processor;
stalling the multi-cycle instruction in the decode stage; and
issuing a plurality of push instructions to subsequent stages in the pipeline according to a state machine.

15. The method of claim 14, wherein when the multi-cycle instruction specifies pushing two registers and issuing a plurality of instructions comprises:
transitioning from a first state to a second state and issuing a first push instruction; and
transitioning from the second state back to the first state and issuing a second push instruction.

16. The method of claim 14, wherein when the multi-cycle instruction specifies pushing three or more registers on stack, issuing a plurality of instructions comprises:
transitioning from a first state to a second state and issuing an instruction a first push instruction;
issuing a number of push instructions until two registers remain to be pushed;
transitioning from the second state to a third state and issuing another push instruction to push the second to last register; and
transitioning from the third state back to the first state and issuing a push instruction to push the last register.

17. The method of claim 14, wherein when the multi-cycle instruction specifies pushing multiple data registers and multiple pointer registers on a stack, and issuing a plurality of instructions comprises:

transitioning from a first state to a second state and issuing an instruction a first instruction to push a data register;

issuing a number of push instructions until one data register remains to be pushed;

transitioning from the second state to a third state and issuing another push instruction to push the final data register;

issuing a number of push instructions until two pointer registers remains to be pushed;

transitioning from the third state to a fourth state and issuing a push instruction to push the second to last pointer register; and transitioning from the fourth state back to the first state and issuing a push instruction to push the last pointer register.

18. The method of claim 14, wherein stalling the multi-cycle instruction comprises asserting a stall signal when the multi-cycle instruction specifies pushing more than one registers.

19. An apparatus comprising:
an execution pipeline having a plurality of stages including a decode stage; and
a multi-cycle instruction (MCI) controller adapted to detect a multi-cycle instruction prior to the decode stage and assert a stall signal to stall the multi-cycle instruction entering the decode stage of the execution pipeline, wherein the MCI controller issues a plurality of instructions to subsequent stages in the pipeline when the multi-cycle instruction is stalled.

20. The apparatus of claim 19 further comprising a stall controller receiving the MCI controller stall signal from the MCI controller and generating a plurality of stall signals to stall the decode stage holding the multi-cycle instruction and prior stages in the pipeline.

21. The apparatus of claim 19, wherein the MCI controller is adapted to issue the same instruction a number of times when the multi-cycle instruction is stalled.

22. The apparatus of claim 19, wherein the MCI controller is adapted to issue a push instruction to direct the pipeline to push a plurality of registers.

23. The apparatus of claim 19, wherein the MCI controller is adapted to issue a number of different instructions when the multi-cycle instruction is stalled.

24. The apparatus of claim 19, wherein the MCI controller is adapted to issue instructions to push a return address for a subroutine on a stack, push a frame pointer on the stack, move a stack pointer to the frame pointer and update the stack pointer based on a frame size for the subroutine.

25. The apparatus of claim 19, wherein the MCI controller asserts the stall signal when the multi-cycle instruction specifies either popping or pushing more than one registers.

26. A system comprising:
a Flash memory device; and
a processor coupled to the Flash memory device, wherein the processor includes an execution pipeline having a plurality of stages, including a decode stage, and a multi-cycle instruction (MCI) controller adapted to detect a multi-cycle instruction prior to the decode stage and assert a stall signal to stall the multi-cycle instruction within the decode stage of the execution pipeline; wherein the MCI controller is adapted to issue a plurality of instructions to subsequent stages in the pipeline when the multi-cycle instruction is stalled.

27. The system of claim 26, wherein the processor further comprises a stall controller receiving the MCI controller stall signal from the MCI controller and generating a plurality of stall signals to stall the decode stage holding the multi-cycle instruction and prior stages in the pipeline.

28. The system of claim 26, wherein the MCI controller is adapted to issue the same instruction a number of times when the multi-cycle instruction is stalled.

29. The system of claim 26, wherein the MCI controller is adapted to issue a number of different instructions when the multi-cycle instruction is stalled.

30. The system of claim 26, wherein the MCI controller asserts the stall signal when the multi-cycle instruction specifies at least one of popping and pushing more than one registers.

31. A method comprising:
receiving a link machine instruction;
detecting the multi-cycle instruction prior to a decode stage within a pipeline of a pipelined processor;
stalling the multi-cycle instruction in the decode stage; and
executing the link instruction by issuing a plurality of instructions to subsequent stages in the pipeline according to a state machine.

32. The method of claim 31, wherein issuing a plurality of instructions comprises:
transitioning from a first state to a second state and issuing an instruction to push a return address on a stack;
transitioning from the second state to a third state and issuing an instruction to push a frame pointer on the stack;
transitioning from the third state to a fourth state and issuing an instruction to move a stack pointer to the frame pointer; and
transitioning from the fourth state back to the first state and issuing an instruction to update a stack pointer based on a frame size specified by the multi-cycle machine instruction.

33. A method comprising:
receiving an unlink machine instruction;
detecting the multi-cycle instruction prior to a decode stage within a pipeline of a pipelined processor;
stalling the multi-cycle instruction in the decode stage; and
executing the unlink instruction by issuing a plurality of instructions to subsequent stages in the pipeline according to a state machine.

34. The method of claim 33, wherein issuing a plurality of instructions comprises:
transitioning from a first state to a second state and issuing an instruction to restore a return address from a stack;
transitioning from the second state to a third state and issuing an instruction to restore a stack pointer; and
transitioning from the third state back to the first state and issuing an instruction to restore a frame pointer from the stack.

35. An apparatus comprising:
state machine logic to control the issuing of a plurality of sub-operations in a pipelined processor in response to a multi-cycle machine instruction being received and stalled in a decode stage within the pipelined processor where the multi-cycle instruction is first detected prior to the decode stage; and
an address generation unit adapted to generate register addresses for use during the execution of the sub-operations.

36. The apparatus of claim 35, wherein the address generation unit comprises a counter for incrementing or decrementing a current register address.

37. The apparatus of claim 35, wherein the address generation unit comprising a clocked storage circuit to store a current register address.

* * * * *

UNITED STATES PATENT AND TRADEMARK OFFICE
CERTIFICATE OF CORRECTION

PATENT NO. : 7,472,259 B2 Page 1 of 1
APPLICATION NO. : 09/731523
DATED : December 30, 2008
INVENTOR(S) : Gregory A. Overkamp et al.

It is certified that error appears in the above-identified patent and that said Letters Patent is hereby corrected as shown below:

On the title page item (54), "MULTI-CYCLE INSTRUCTIONS," and at column 1, line 1, should read --STALLING MULTI-CYCLE INSTRUCTIONS--.

Col. 11, in claim 10, at line 5; col. 12, in claim 12, at line 6; col. 12, in claim 16, at line 5; and in col. 13, claim 17, at line 6, the phrase "an instruction" should be deleted.

Col. 14, in claim 31, line 2, the phrase "receiving a link machine instruction" should be replaced with --receiving a multi-cycle, link machine instruction--.

Col. 14, in claim 33, line 2, the phrase "receiving an unlink machine instruction" should be replaced with --receiving a multi-cycle, unlink machine instruction--.

Col. 14, in claim 35, line 2, the word "the" should be deleted.

Signed and Sealed this

Nineteenth Day of May, 2009

JOHN DOLL
*Acting Director of the United States Patent and Trademark Office*